United States Patent Office 3,062,089
Patented Nov. 6, 1962

3,062,089
GRATING MONOCHROMATORS
Albert E. Martin, Newcastle-upon-Tyne, England, assignor to Sir Howard Grubb Parsons & Company Limited, Walkersgate, Newcastle-upon-Tyne, England
Filed Aug. 11, 1959, Ser. No. 833,044
5 Claims. (Cl. 88—14)

When parallel radiation falls on a plane ruled diffraction grating at an angle of incidence $i_1$ (FIGURE 1), rays diffracted at an angle $i_2$ reinforce each other if the following well known equation is satisfied:

$$d \sin i_1 + d \sin i_2 = n\lambda \tag{1}$$

where:

$d$ is the grating spacing,
$\lambda$ the wavelength of the particular radiation under consideration, and
$n$ the order of the spectrum.

This is frequently referred to as the grating equation.

In infra-red monochromators a Littrow arrangement is commonly used with a plane grating as the dispersive element and then $i_1$ and $i_2$ are very nearly equal, since one collimating mirror is used for both incident and diffracted beams. On the other hand, with the Ebert system two separate mirrors are used and $i_2 - i_1 = \alpha$, where $\alpha$ is constant. In this case from Equation 1

$$d \sin i_1 + d \sin (i_1 + \alpha) = n\lambda = 2d \sin (i_1 + \alpha) \cos \frac{\alpha}{2} \tag{2}$$

In all cases as the grating is rotated so that $i_1$ increases steadily, $\lambda$ also increases according to Equation 2 but any particular grating can only be used over a limited angular range since the diffracted energy falls off on both sides of the "blaze" angle, i.e. when the incident and diffracted rays make equal angles with the normal to the groove (FIGURE 2).

The drop in efficiency of the grating is most pronounced on the short wavelength side since, naturally, the groove surface tends to act as a normal reflector when the wavelength is appreciably less than the grating spacing but when the wavelength is greater than the grating spacing the radiation is more readily diffracted in the desired direction. As an example, a grating with 2,500 lines per inch and "blazed" for $9\mu$ in the first order is usable from 5 to $15\mu$ in this order when a radiation source such as a Nernst filament (approximating to a black body at 2,000K) is used as a source of radiation. Since in a normal infra-red spectrometer it is desirable to cover the minimum range of 2 to $15\mu$, the spectral interval 2 to $5\mu$ must be included and hitherto this has been done by operating in the 2nd, 3rd and 4th orders. Thus in the 4th order it s possible to scan from 2 to $2.5\mu$ (i.e. 8 to $10\mu$ in the first order) but the use of multiple orders complicates the design of the spectrometer and moreover the method employed for isolating the desired order is quite critical since in the example cited it is necessary to select the 4th order, $2\mu$, and reject the 5th order, $1.6\mu$, whereas by working at $2\mu$ in the first order one has the much easier task of rejecting the second order at $1\mu$.

It would be possible to employ more than one grating and use each over its most effective spectral range, but this involves the mechanical complication of changing from one grating to another at some specified wavelength and this is not possible without causing a discontinuity in the spectral record.

It is the purpose of the present invention to provide a new form of grating dispersive element which overcomes these difficulties and enables a wide range, such as 2 to $15\mu$, to be covered in the first order.

The invention consists of a grating dispersive element for a monochromator which element is composed of a plurality of plane diffracting areas, each area being ruled with equi-spaced grooves, the spacings for the separate areas bearing a simple numerical relationship to one another, i.e. 1:1, 1:2, etc., with all grooves parallel and a different groove angle being associated with each area.

The invention also consists in a grating dispersive element for a monochromator in accordance with the preceding paragraph which element comprises at least two diffraction gratings mounted in fixed relationship to one another, the element being adapted to rotate about a fixed axis so that each grating in turn receives radiation from collimating means, each grating being adapted to diffract at different regions of the wavelength range.

The invention also consists in a grating dispersive element in accordance with the preceding paragraph in which the element is rotated about an axis lying outside the element.

The invention also consists in a grating dispersive element in accordance with the first of the preceding three paragraphs in which the grating dispersive element comprises a single grating in which a constant groove spacing is employed but the groove angle is changed at least once during the ruling of the grating.

The invention also consists in a grating dispersive element in accordance with the preceding paragraph adapted for rotation about an axis lying in the grating.

The invention also consists in a grating dispersive element for a monochromator substantially as described hereinafter with reference to the accompanying diagrammatic drawings in which.

Figure 1:
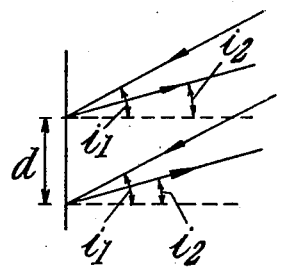
FIGURE 1 shows a plane ruled grating with radiation impinging thereon.
Figure 2:
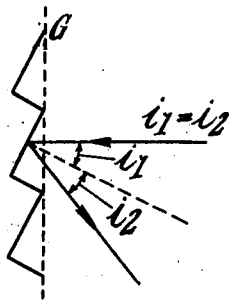
FIGURE 2 shows a plane echelette grating with the sawtooth groove form shown.

In carrying the invention into effect in one form by way of example the grating dispersive element comprises a single grating in which a constant groove spacing is employed but the groove angle which determines the "blaze" wavelength is changed at least once during the ruling of the grating. As an example, with 2,500 lines per inch, half of the grating may be blazed for $3.5\mu$ and the remainder for $9\mu$. In the first order the first half of the grating is effective from 2 to $5.5\mu$ and the second half from 5.5 to $15\mu$. Thus the effective coverage is obtained from 2 to $15\mu$ although there will be loss of energy at any particular wavelength as compared with a grating blazed for that wavelength. At 3.5 and $9\mu$ the loss of energy will be somewhat less than 50% if equal grating areas are employed, since the less effective grating will still make some contribution.

It is of course not necessary for the two grating areas to be exactly equal since from energy considerations it may be desirable to give preference to either the lower or higher wavelengths.

Further, it is possible to use more than two grating areas and, for example, three areas with equal spacings and blazed respectively for 3, 6 and $12\mu$ may be employed.

It is not essential for the separate grating areas to be ruled with the same spacing, but the spacings must bear a simple and exact relation to one another, i.e. 1:2, 2:3 etc. If a grating with two areas, 2,500 lines per inch blazed for $3.5\mu$, and 1,250 lines per inch blazed for $9\mu$, be considered, the coarse part of the grating will be used in the second order and will give the same result as a 2,500 lines per inch grating in the first order except that the usable wavelength range tends to be reduced in the higher orders.

As an alternative to a single grating, separate gratings can be used and, whilst it is desirable for the grating spacings to be exactly in the correct numerical relationship, if separate gratings are employed there may be a small discrepancy in spacing which need not, however, prevent successful use of two or more gratings provided that simple measures are taken. As an example it is convenient to consider two 2,500 lines per inch gratings blazed at 3.5 and $9\mu$ respectively with a 1% difference in groove spacing and to suppose that the gratings are set at a small angle so that the wavelength falling on the monochromator exit slit is exactly the same for both at some particular point in the wavelength range, say $5.5\mu$ where the energy contributions are about equal.

At both shorter and longer wavelengths than $5.5\mu$ there will be a small wavelength discrepancy but this will be less than 1% of the wavelength for most of the range 2 to $15\mu$. The effect of this wavelength discrepancy will be to impair the resolution at wavelengths removed from $5.5\mu$, but in practice this is not very serious since as the wavelength changes from $5.5\mu$ one or other of the gratings becomes the main contributor of energy.

Figure 3:
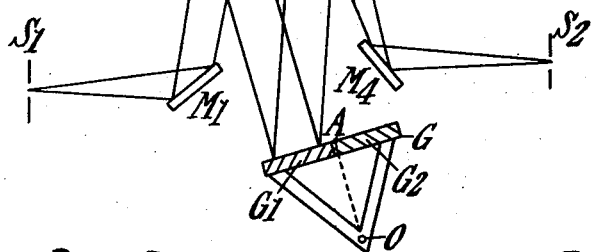
FIGURE 3 shows a monochromator incorporating a grating dispersive element in accordance with one form of the present invention.

The loss of energy, as compared with a single ideally blazed grating, together with the loss of resolution occasioned by spacing discrepancies can be practically eliminated by adopting for example the grating mount shown in FIGURE 3.

FIGURE 3 shows a complete grating monochromator, but without fore-prism or other order selection means. $S_1$ is the entrance slit of the monochromator through which radiation from a suitable source such as a Nernst filament passes. $M_1$ is a plane mirror which directs the radiation on to a spherical mirror $M_2$ from which a parallel beam is directed onto the plane grating dispersive element generally indicated at G. The diffracted beam falling on spherical mirror $M_3$ is thence reflected on to plane mirror $M_4$ and is finally brought to a focus on the exit slit $S_2$.

The element G may be formed from separate gratings or ruled on a common base, but for the present purpose it is assumed that there are two separate gratings and that the gratings have the same spacing (2,500 lines per inch) but are differently blazed, $G_1$ for a wavelength of $3.5\mu$ and $G_2$ for $9\mu$.

The grating assembly is rigidly mounted with the gratings in fixed relationship to each other so that it can rotate about point O and the distance OA must be chosen in a manner to be described hereinafter.

If $i_1$ is the angle of incidence for the radiation falling on $G_1$ while $i_1+\alpha$ is the angle made by the diffracted rays with the normal to the surface of $G_1$ ($\alpha$ is a constant), it is well known that according to the grating equation $$d \sin i_1 + d \sin (i_1+\alpha) = n\lambda = 2d \sin\left(i_1+\frac{\alpha}{2}\right)\cos\frac{\alpha}{2}$$

where:

$d$ is the grating spacing,
$\lambda$ is the wavelength of the diffracted beam, and
$n$ is the order of diffraction.

It is assumed that order selection means are available to isolate the order desired and, for simplicity, that $n$ is unity, although this is by no means essential to the invention.

As $i_1$ increases the wavelength increases in accordance with above equation, but as may be seen from FIGURE 3, $G_1$ also swings out of the beam and is steadily replaced by grating $G_2$. Since it has been assumed that both gratings have the same value for $d$, the grating equation applies equally to both and the wavelength changes as $i_1$ is altered exactly for a single grating.

At low wavelengths when $i_1$ is small, $G_1$ only is in use and since it is blazed for a low wavelength, radiation is efficiently diffracted. As $i_1$ increases grating $G_2$ is gradually brought into use until at long wavelength, radiation is also efficiently diffracted.

At intermediate wavelengths both gratings are utilized and each contributes some energy to the diffracted beam. Of course, if there is any difference in the spacing of the two gratings the resolution of the monochromator will be impaired since each grating will be diffracting a slightly different wavelength, but this effect can be kept acceptably low by ensuring that the difference in grating spacing is nil or very small. As explained previously, when there is a slight difference in spacing the gratings are set to small angle to one another so that the diffracted wavelengths are exactly equal at some value intermediate between the "blaze" wavelengths, e.g. $5.5\mu$ for 3.5 and $9\mu$, and at this intermediate wavelength the energy contributions from the two gratings are approximately equal. As the angle of incidence changes from the setting corresponding to $5.5\mu$ a small wavelength discrepancy will appear but its effect will be minimised since as the blaze wavelength for one particular grating is approached the energy contribution from that grating will increase, as compared with the second grating, and further, since the effective area of the second grating is also diminishing its energy contribution suffers a double reduction and becomes negligible before the wavelength discrepancy becomes appreciable.

Instead of having an axis of rotation which lies outside the grating element as shown in FIGURE 3 the axis of rotation can be in the element itself but whilst this would be suitable in certain instances it suffers in comparison with the construction of FIGURE 3 in that only part of the beam is being fully utilised at any given instant whereas with the construction of FIGURE 3 the whole of the beam of radiation is concentrated on the effective area of the grating element or the effective grating of the element if several gratings are being used.

The method of determining the distance OA for a given value of $d$ and wavelength range is shown in FIGURE 4.

The position of the grating element G is shown for the extreme wavelengths of the range, and the direction of the incident rays is indicated by BC and DE in both cases. Grating $G_1$ is represented by CE at the minimum wavelength and by CF at the maximum, while grating $G_2$ is represented by EJ and CE, respectively. Angle OAH has the value of $i_1$ appropriate to the wavelength in each case, AH being parallel to and OH perpendicular to BC. These values of $i_1$ will be designated $\theta_1$ and $\theta_2$ respectively.

Figure 4A:
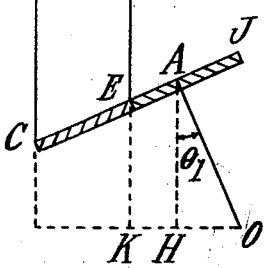
FIGURES 4a and 4b show two positions of the grating dispersive element relative to the axis of rotation.
Figure 4B:
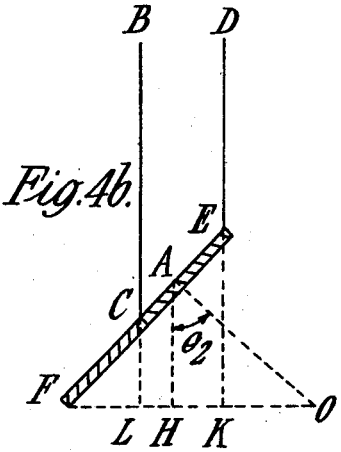

From FIGURE 4a, $$OK = OA \sin \theta_1 + AE \cos \theta_1$$

and from FIGURE 4b, $$OL = OA \sin \theta_2 + AC \cos \theta_2$$

But if matters are arranged so that grating $G_1$ which is fully engaged in 4a has just passed completely out of the beam in 4b AE in $(a) = AC$ in $(b) = h$, say and $OL - OK = OA (\sin \theta_2 - \sin \theta_1) + h (\cos \theta_2 - \cos \theta_1) = LK$. From this relation OA can be found since $h$ can be any given reasonable value, including zero, and LK is the width of the beam of incident radiation.

While the invention has been particularly described with respect to the infra-red region of the spectrum, similar principles are applicable to the visible and ultra-violet regions.

I claim:

1. An echelette diffraction grating element for a monochromator which element is rotatable about a fixed axis and has grooves thereon which are parallel to said axis, the said grooves being disposed in a plurality of separate diffracting areas of the element, each with its own groove spacing, the groove spacing in any given area being constant, the said diffracting areas being disposed in substantially the same or parallel planes and disposed adjacent to one another in a direction perpendicular to said fixed axis, each diffracting area being used for a different region of the whole wavelength range to be covered by the element which range is effectively covered by the individual diffracting areas used in a chosen sequence, the blaze angle for any given area being chosen to give maximum energy at a wavelength lying within the wavelength region covered by the use of said area and the spacing $d$ of the grooves in any given area being governed by the chosen order of diffraction $n$ for said area to make the ratio $d/n$ for the area equal to the ratio $d/n$ for each of the other areas.

2. An echelette diffraction grating element for a monochromator which element is rotatable about a fixed axis and has grooves thereon which are parallel to said axis, the said grooves being disposed in a plurality of separate diffracting areas of the element each with its own groove spacing, the groove spacing in any given area being constant, the said diffracting areas being disposed in substantially the same or parallel planes and disposed adjacent to one another in a direction perpendicular to said fixed axis, each diffracting area being used for a different region of the whole wavelength range to be covered by the element, consecutive diffracting areas starting from one end of the element being used for consecutive regions of the said wavelength range, the blaze angle for any given area being chosen to give maximum energy at a wavelength lying within the wavelength region covered by the use of said area and the spacing $d$ of the grooves in any given area being governed by the chosen order of diffraction $n$ for said area to make the ratio $d/n$ for the area equal to the ratio $d/n$ for each of the other areas.

3. A grating dispersive element as claimed in claim 1 in which the element is rotated about an axis lying outside the element.

4. A grating dispersive as claimed in claim 1 adapted for rotation about an axis lying in the grating.

5. An echelette grating dispersive element for a monochromator as claimed in claim 2 which element comprises at least two diffraction gratings mounted in fixed relationship to one another in substantially parallel planes, the element being adapted to rotate about a fixed axis so that each grating in turn receives radiation from collimating means each grating being blazed for wavelengths in different regions of the wavelength range to be covered.

References Cited in the file of this patent

UNITED STATES PATENTS 2,453,164     Swings _____ Nov. 9, 1948

FOREIGN PATENTS 790,928     Great Britain _____ Feb. 19, 1958

OTHER REFERENCES

"Infra-Red Instrumentation and Techniques," Williams, The Review of Scientific Instruments, vol. 19, No. 3 (March 1948), pages 135, 150–153.

Diffraction Gratings, published by Bausch & Lomb Optical Co. (Rochester, N.Y.), January 1954, 8 printed pages.

News Release No. 228 (Subtitled: "New Concave Gratings Listed for Quick Accurate Ordering"), published by Bausch & Lomb Optical Co., Rochester, N.Y., June 15, 1959, 4 pages.